C. M. PETERSEN AND O. J. BODEN.
ELECTRICAL APPARATUS.
APPLICATION FILED JUNE 4, 1919.
1,346,606.
Patented July 13, 1920.
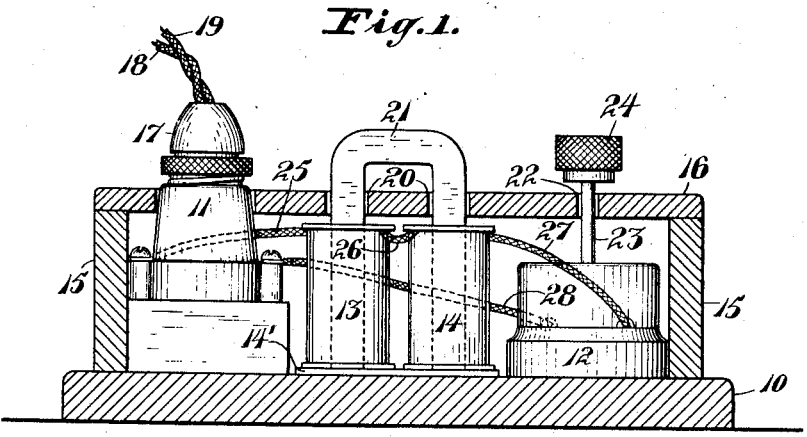
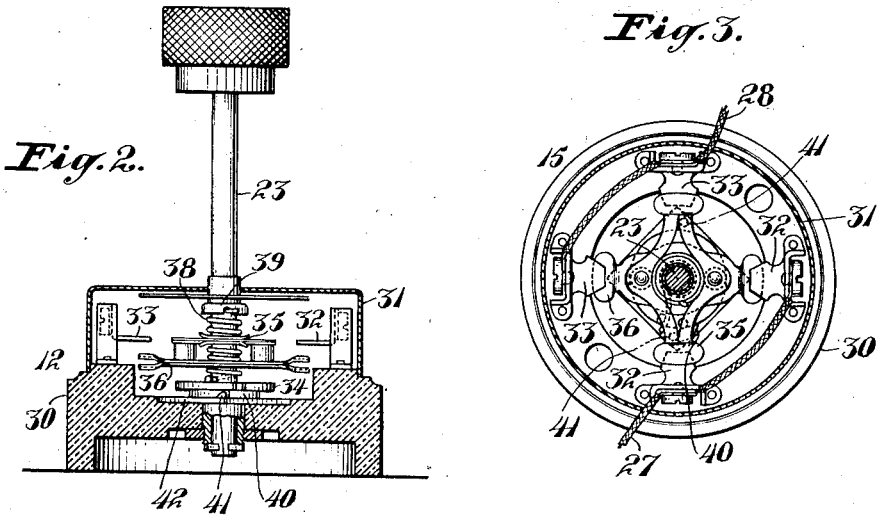
INVENTORS
*C. M. Petersen*
*O. J. Boden*
By *Shong & Townsend*
ATTORNEYS

UNITED STATES PATENT OFFICE.

CHRISTIAN M. PETERSEN AND OSCAR J. BODEN, OF SAN FRANCISCO, CALIFORNIA.

ELECTRICAL APPARATUS.

1,346,606.　　　　　Specification of Letters Patent.　　Patented July 13, 1920.

Application filed June 4, 1919. Serial No. 301,715.

*To all whom it may concern:*

Be it known that we, CHRISTIAN M. PETERSEN and OSCAR J. BODEN, citizens of the United States, residing at the city and county of San Francisco and State of California, have invented new and useful Improvements in Electrical Apparatus, of which the following is a specification.

This invention relates to an electrical apparatus and particularly pertains to a device for energizing magnets.

It is the principal object of the present invention to provide a device for energizing magnets which is decidedly simple in its operation and construction and may be used interchangeably upon either direct or alternating currents. One of the special features of the present invention is the provision of a switch which will operate to make an instantaneous contact and will thus make it possible to use the device without disadvantage upon alternating currents as the make and break of the circuit will be so rapid that the coils of the apparatus will be only influenced by a portion of one cycle of the current.

The present invention contemplates the use of a connecting plug to which is secured by electrical conduits a pair of coils having central openings into which the opposite legs of a horseshoe magnet may be placed. The control of the circuit which includes the coils is brought about by a peculiar snap switch, the blades of which are normally out of register and are adapted to only touch momentarily to make the contact and then to return to their non-registering position.

The invention is illustrated by way of example in the accompanying drawings in which:

Figure 1 is a view in vertical section and elevation showing the complete apparatus.

Fig. 2 is an enlarged view in vertical section through the switch used in the present device.

Fig. 3 is a view in horizontal section, more particularly showing the movable and fixed contact members and the operating mechanism therefor.

Referring more particularly to the drawings, 10 indicates a baseboard. This baseboard may be of any design and is here shown as being rectangular in shape. The board serves as a mounting for an electric socket 11, a switch 12 and a pair of induction coils 13 and 14 mounted on an armature bar 14'. These members are all fastened upon the board and are inclosed by sidewalls 15 and a cover board 16. The cover board is formed with an opening through which the electric socket 11 extends and by which socket electrical connections are made through the medium of a plug 17 and electric conductors 18 and 19. Two rectangular openings 20 are formed through the center of the board 16 to receive the two legs of a horseshoe magnet 21. The board 16 is further formed with an opening 22 through which the stem 23 of the switch 12 projects. This stem is fitted with a knurled nut 24, which stands upon the outside of the cover 16 and permits the stem to be rotated when desired. One terminal of the plug 11 is fitted with an electric conductor 25 which leads to the winding of coil 13. The other end of this winding is connected with the winding of the coil 14 by a connecting wire 26. The terminating end of the winding of coil 14 is electrically connected to one pole of the switch 12 by means of a conductor 27. The opposite pole of this switch is connected to the remaining pole of the electric plug 11 by a conductor 28.

Under normal conditions and when using direct current, it is possible to energize the magnet current 21 without the use of any special switch as indicated at 12, other than a knife switch which may be closed and opened at the will of the operator. When alternating current is used, however, it is necessary that the circuit be instantaneously completed and broken. The methods in vogue at the present time require considerable skill on the part of the operator in order to quickly make and break this circuit and for this reason the switch 12 is designed with a special make and break mechanism, which insures that an instantaneous flow of current will be permitted, when desired. It is to be understood that any type of switch performing this function might be used without departing from the spirit of the invention, and it will be evident that by the use of a switch of this character, it will not be necessary to use expensive generating sets or rectifiers to convert an alternating current into a direct current as is now the case.

The switch 12 is formed with an insulating base 30. This base is mounted upon the baseboard 10 and supports a pressed metal switch case 31. The switch case is designed to close a switch mechanism and a plurality of switch contact members 32 and 33. The contact members 32 are both connected to the wire 27 and the contact members 33 are both connected to the wire 28. By reference to Fig. 2, it will be noted that the contact members 33 and 32 are arranged upon diametrically opposite sides of the axis of the switch stem 23, one set being in a higher horizontal plane than the other set. The switch stem is provided with a carrier 34, upon the top of which is secured a double contact member 35. This member has a pair of fingers adapted to yieldably engage the contact members 32 and 33 as it passes by them. Standing at right angles to the contact member 35 and secured beneath the other set of contacts and to the plate 34 is a movable contact member 36. This member is formed with spring fingers identical with those previously mentioned and these fingers are adapted to yieldably engage the contact members 32 and 33 which are in the lowermost horizontal plane. The plate 34 is mounted to freely rotate upon the stem 23 and is connected to the stem by means of a coil spring 38. This coil spring is secured by one of its ends to a sleeve 39 upon the stem and by its other end to the plate 34. Thus it would be evident that rotation of the stem 23 would produce simultaneous rotation of the plate 34 and the movable contact members. This rotation, however, is retarded by an escapement mechanism comprising a lock finger 40 which is carried by the plate 34 and is retracted by the rotation of the stem 23. The lock finger normally engages one of a series of lugs 41 mounted upon the plate 42 secured to the base 30 and will hold the lower portion of the switch against movement until the finger has been retracted by rotation of the stem 23, after which the tension of the spring 38 will act to give the movable switch members an instantaneous advance and produce the result desired.

In operation of the present invention the electric plug 17 is suitably positioned within the socket 11 and a magnet 21 is disposed with its ends projecting into the central opening of the coils 13 and 14. The switch knob 24 is rotated and this in turn will rotate the stem 23; normally the movable contact member of the switch will stand at a point between the fixed contact members and as the stem is rotated the coil spring 38 will be tightened. This tightening action will take place until the lock finger 40 has been retracted from the side of the lug 41, after which the switch member will be given a quick movement which will continue until the lock finger 40 has encountered another one of the lugs 41. In the present instance these lugs are placed upon diametrically opposite sides of the plate 42 and will thus insure that the one-half cycle of the movable switch member will take place at each time the lock finger 40 is released from its engagement with the lug 41. When the lock finger is released the movable contact members will fly past the fixed contact members and one of the upper members will encounter one of the higher fixed contact members, while one of the lower members will encounter the other of the fixed contacts. This will cause the circuit to be instantaneously made and broken and will thus insure that the alternating current will only pass through the coils 13 and 14 momentarily. The action will be identical with that produced by the direct current and will instantly energize the magnet.

While we have shown the preferred form of our invention as now known to us it will be understood that various changes in the combination, construction and arrangement of parts may be made by those skilled in the art without departing from the spirit of the invention as claimed.

Having thus described our invention, what we claim and desire to secure by Letters Patent is:

1. In combination with a pair of magnet energizing coils a switch, fixed contacts within said switch, movable contacts normally out of register with said fixed contacts, and means whereby a flying contact may be made between the movable and fixed contact members.

2. An electrical apparatus comprising a case, an electric plug socket mounted within said case, a pair of magnet energizing coils within said case and an instantaneously operating make and break switch adapted to establish a circuit through the coils momentarily.

3. An electrical apparatus comprising a case, an electric plug socket mounted within said case, a pair of magnet energizing coils within said case, an instantaneously operating make and break switch adapted to establish a circuit through the coils momentarily, said switch comprising a plurality of stationary contacts disposed about a common point, a plurality of rotatable contact members mounted on said common point and adapted to establish an electrical connection between the stationary contacts, and means for turning said movable contacts whereby a momentary connection will be made between said stationary contacts.

4. In combination with a pair of magnet energizing coils, a normally open switch for closing the circuit through said coils, said switch being provided with spring means whereby the circuit through said coils is established only momentarily.

5. An electrical apparatus comprising a case, a pair of magnet energizing coils within said case, plug means electrically connected to said coils for attachment to a source of power and an automatically operating make and break switch in the circuit of said coils to establish through said coils only a momentary current.

In testimony whereof we have hereunto set our hands in the presence of two subscribing witnesses.

CHRISTIAN M. PETERSEN.
OSCAR J. BODEN.

Witnesses:
SILVEY PEARLE TINSLER,
R. P. TALBOT.